United States Patent
Shimizu et al.

(10) Patent No.: US 9,696,220 B2
(45) Date of Patent: Jul. 4, 2017

(54) MALFUNCTION DIAGNOSIS APPARATUS

(71) Applicant: Toshiba Alpine Automotive Technology Corporation, Iwaki-shi (JP)

(72) Inventors: Hiroki Shimizu, Iwaki (JP); Keita Taniguchi, Iwaki (JP)

(73) Assignee: Toshiba Alpine Automotive Technology Corporation, Iwaki-shi (JP)

( * ) Notice: Subject to any disclaimer, the term of this patent is extended or adjusted under 35 U.S.C. 154(b) by 564 days.

(21) Appl. No.: 14/320,769

(22) Filed: Jul. 1, 2014

(65) Prior Publication Data

US 2015/0211945 A1    Jul. 30, 2015

(30) Foreign Application Priority Data

Jan. 24, 2014 (JP) .................. 2014-011353

(51) Int. Cl.
*G01K 15/00* (2006.01)
*G01K 7/22* (2006.01)

(52) U.S. Cl.
CPC ............. *G01K 15/007* (2013.01); *G01K 7/22* (2013.01)

(58) Field of Classification Search
CPC ................................ G01K 7/22; G01K 15/007
See application file for complete search history.

(56) References Cited

U.S. PATENT DOCUMENTS

| | | |
|---|---|---|
| 2005/0178130 A1 | 8/2005 | Van Gilder et al. |
| 2008/0196487 A1 | 8/2008 | Suzuki |
| 2009/0003405 A1 | 1/2009 | Corbet et al. |
| 2010/0269802 A1* | 10/2010 | Nakashima ........... F02D 41/062 123/568.21 |

FOREIGN PATENT DOCUMENTS

| | | |
|---|---|---|
| JP | 2001-009442 | 1/2001 |
| JP | 2009-211472 | 9/2009 |
| WO | WO 2007/063396 A2 | 6/2007 |
| WO | WO 2007/063396 A3 | 6/2007 |

OTHER PUBLICATIONS

Extended European Search Report issued on Oct. 28, 2014 in the corresponding European Application No. 14173862.5.

* cited by examiner

*Primary Examiner* — Mischita Henson
(74) *Attorney, Agent, or Firm* — Oblon, McClelland, Maier & Neustadt, L.L.P.

(57) ABSTRACT

A malfunction diagnosis apparatus includes: a first temperature detector; a second temperature detector that is placed in a different location from where the first temperature detector is placed; a difference value calculation device calculates a difference value between a detection value from the first temperature detector and a detection value from the second temperature detector; a mapping device carries out mapping of the difference value and calculates a correction value using the frequency of the difference value; a malfunction diagnosis device diagnoses whether or not there is a malfunction in the first temperature detector and the second temperature detector; and a recovery device calculates, as a detection value of the first or second temperature detector judged to be malfunctioning, a value by adding the correction value to a detection value from the first or second temperature detector judged not to be malfunctioning.

16 Claims, 5 Drawing Sheets

- V1: Pick-Up built-in, for Pick protection
- V2: PWB built-in, for motor-gain control

MALFUNCTION DIAGNOSIS APPARATUS

CROSS-REFERENCE TO RELATED APPLICATIONS

This application is based upon and claims the benefit of priority from the prior Japanese Patent Application No. 2014-011353 filed on Jan. 24, 2014, the entire contents of which are incorporated herein by reference.

FIELD

Embodiments described herein relate generally to a malfunction diagnosis apparatus that allows a drive apparatus to normally operate in an environment in which the temperature fluctuates even after a temperature detection circuit breaks down.

BACKGROUND

An in-vehicle navigation or audio apparatus uses a temperature detection circuit for appropriate control so that the apparatus can normally operate even in an environment in which the temperature fluctuates.

The current navigation and audio apparatuses cannot accurately detect the ambient temperatures of the navigation and audio apparatuses after the temperature detection circuit breaks down. Therefore, the problem is that optimal control is impossible in the environment in which the temperature fluctuates.

DETAILED DESCRIPTION

According to one embodiment, a malfunction diagnosis apparatus includes: a first temperature detection circuit that is placed inside diagnosis-target equipment; a second temperature detection circuit that is placed in a different location inside the diagnosis-target equipment from where the first temperature detection circuit is placed; a difference value calculation device that calculates a difference value between a detection value from the first temperature detection circuit and a detection value from the second temperature detection circuit; a mapping device that carries out mapping of the difference value and calculates a correction value using the frequency of the difference value; a malfunction diagnosis device that diagnoses whether or not there is a malfunction in the first temperature detection circuit and the second temperature detection circuit; and a recovery device that calculates, as a detection value of the first or second temperature detection circuit judged to be malfunctioning, a value by adding the correction value to a detection value from the first or second temperature detection circuit judged not to be malfunctioning, and transmits the calculated value to the diagnosis-target equipment.

Hereinafter, one embodiment of the present invention will be described with reference to the accompanying drawings. Incidentally, the same portions in each diagram are represented by the same reference symbols, and a duplicate description will be omitted.

According to the present embodiment, when one of detection voltages from a plurality of temperature detection circuits enters a preset malfunction diagnosis range, a value obtained by adding a predetermined correction value to a detection value coming from a temperature detection circuit that can normally operate is regarded as a detection value coming from a malfunctioning temperature detection circuit.

Figure 1:
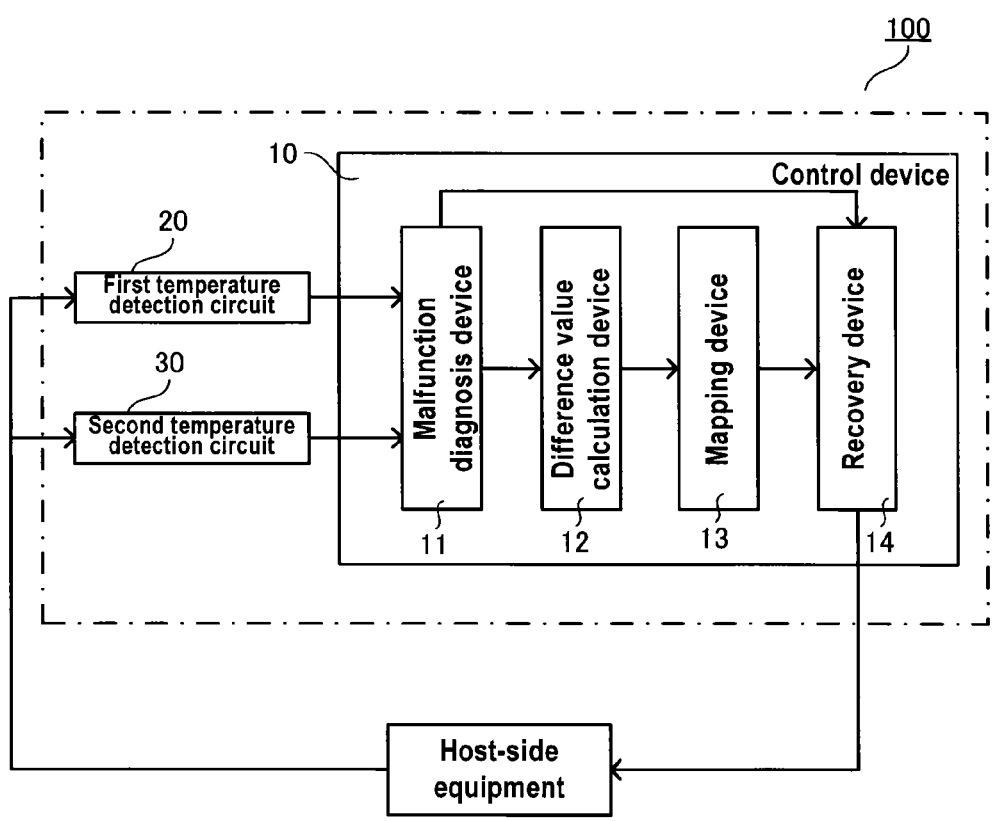
FIG. 1 is a diagram showing an example of the configuration of a malfunction diagnosis apparatus according to an embodiment of the present invention.

FIG. 1 is a diagram showing an example of the configuration of a malfunction diagnosis apparatus according to an embodiment of the present invention. The malfunction diagnosis apparatus of the present embodiment is connected to a diagnosis target apparatus (host-side equipment), and includes a plurality of temperature detection circuits. In one example, which is described below, the malfunction diagnosis apparatus includes two temperature detection circuits. For example, it is preferred that the host-side equipment be a drive apparatus including a pickup that reads information recorded on media or the like and converts the information into electric signals, a main power supply board that controls the gain of a motor, and the like.

As shown in FIG. 1, the malfunction diagnosis apparatus 100 of the present embodiment mainly includes a control device 10, a first temperature detection circuit 20, and a second temperature detection circuit 30. The malfunction diagnosis apparatus 100 carries out malfunction diagnosis and a recovery process based on data obtained by the first temperature detection circuit 20 and the second temperature detection circuit 30.

In the malfunction diagnosis apparatus 100, the control device 10 can be realized as software, which runs on the same CPU as a general-purpose CPU. For example, the control device 10 may include a malfunction diagnosis device 11, a difference value calculation device 12, a mapping device 13, and a recovery device 14.

The malfunction diagnosis device 11 diagnoses whether or not there is a malfunction in the first temperature detection circuit 20 and the second temperature detection circuit 30. The way a malfunction is diagnosed will be detailed later.

The difference value calculation device 12 calculates the difference between a detection value of the first temperature detection circuit 20 and a detect ion value of the second temperature detection circuit 30.

The mapping device 13 carries out mapping of the difference values, and uses the frequency of the difference values in calculating a correction value (which will be detailed later). For the mapping, a histogram is preferably used.

The recovery device 14 performs a recovery process (which will be detailed later) to a detection value of a temperature detection circuit that has been judged to be malfunctioning, and transmits the detection value to the host-side equipment or the drive apparatus.

Figure 2:
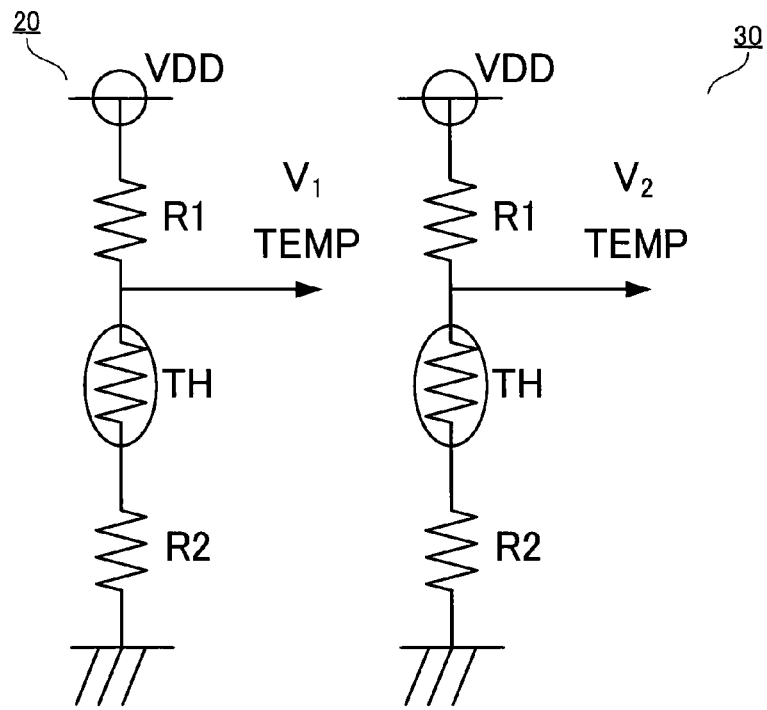
FIG. 2 is a diagram showing one example of the configuration of a first temperature detection circuit and a second temperature detection circuit.

The first temperature detection circuit 20 and the second temperature detection circuit 30 are placed in different locations inside the drive apparatus. FIG. 2 is a diagram showing one example of the configuration of the first temperature detection circuit 20 and the second temperature detection circuit 30. For example, the first temperature detection circuit 20 is placed inside a pickup, which reads information recorded on media or the like and converts the information into electric signals. For example, the first temperature detection circuit 20 includes a thermistor. For example, the second temperature detection circuit 30 is placed on a main power supply board, which controls the gain of a motor of the drive apparatus. For example, the second temperature detection circuit 30 includes a thermistor. The thermistor is made by mixing two to four types of metal oxides, such as iron, nickel, cobalt, manganese and copper, molding the mixture into various shapes, and sintering at high temperatures (1,200 to 1,500 degrees Celsius); the thermistor is a special semiconductor resistor whose resistance varies significantly in the negative range with changes in heat or temperature. The malfunction modes of the thermistor include an open mode and a short mode. The thermistor shifts to the open mode in such cases as when a coil breaks due to an overcurrent that has exceeded a specified range or when a solder crack occurs in a chip component of a temperature detection circuit, for example. The thermistor shifts to the short mode in such cases as when the insulation between coils cannot be maintained due to an overcurrent that has exceeded a specified range and there is a drop in inductance or when the terminals of components are short-circuited due to some foreign substance (such as solder balls or metal pieces), for example.

<Malfunction Diagnosis>

Figure 3:
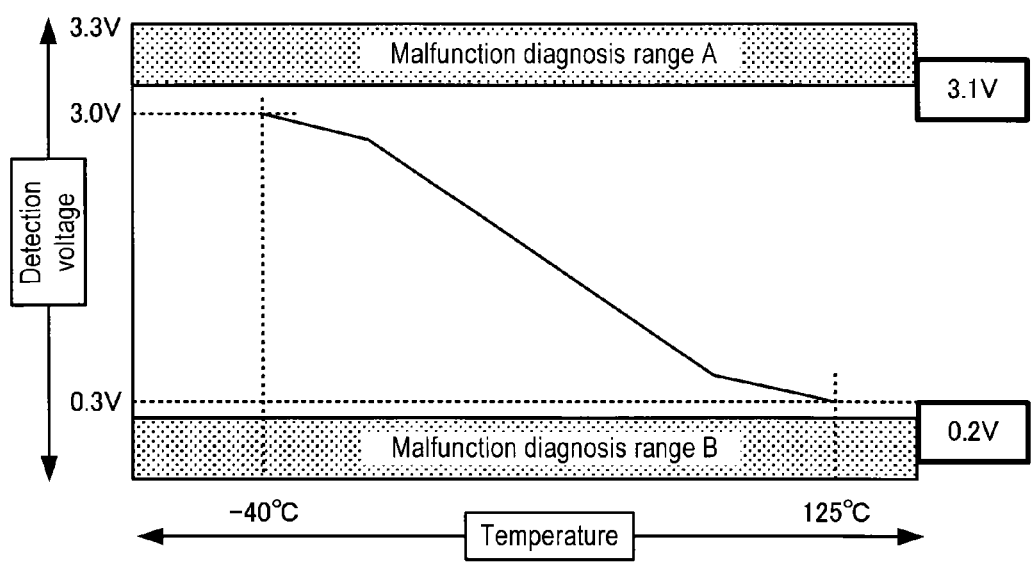
FIG. 3 is a diagram illustrating one example of malfunction diagnosis based on detection values from each temperature detection circuit.

FIG. 3 is a diagram illustrating one example of malfunction diagnosis based on detection values from each temperature detection circuit. As shown in FIG. 2, the first temperature detection circuit 20 and the second temperature detection circuit 30 are used. In FIG. 3, the horizontal axis represents temperature, and the vertical axis represents a detection voltage of a thermistor. In an example shown in FIG. 3, each of the temperature detection circuits 20 and 30 includes a thermistor; the circuit thereof is designed in such a way that an output voltage in the range of 0.3V to 3.0V is normal. The thermistors cover a temperature range from low temperatures to high temperatures, or from −40 degrees Celsius or less to 125 degrees Celsius or more.

If the thermistors are malfunctioning and are in the open mode, the thermistors are drawn to the power-supply voltages (e.g. 3.3V) of the temperature detection circuits 20 and 30. Therefore, from the temperature detection circuits 20 and 30, a voltage value of a malfunction diagnosis range A is detected. If the thermistors are malfunctioning and are in the short mode, the thermistors are fixed to the ground as the electrodes are short-circuited. Therefore, from the temperature detection circuits 20 and 30, a voltage value of a malfunction diagnosis range B is detected.

When a voltage of the malfunction diagnosis range A or B shown in FIG. 3 is detected as a detection voltage value of the first and second temperature detection circuits 20 and 30, the malfunction diagnosis device 11 of the control device 10 judges the first or second temperature detection circuit 20 or 30 to be malfunctioning.

<Calculation of Correction Value>

Figure 4:
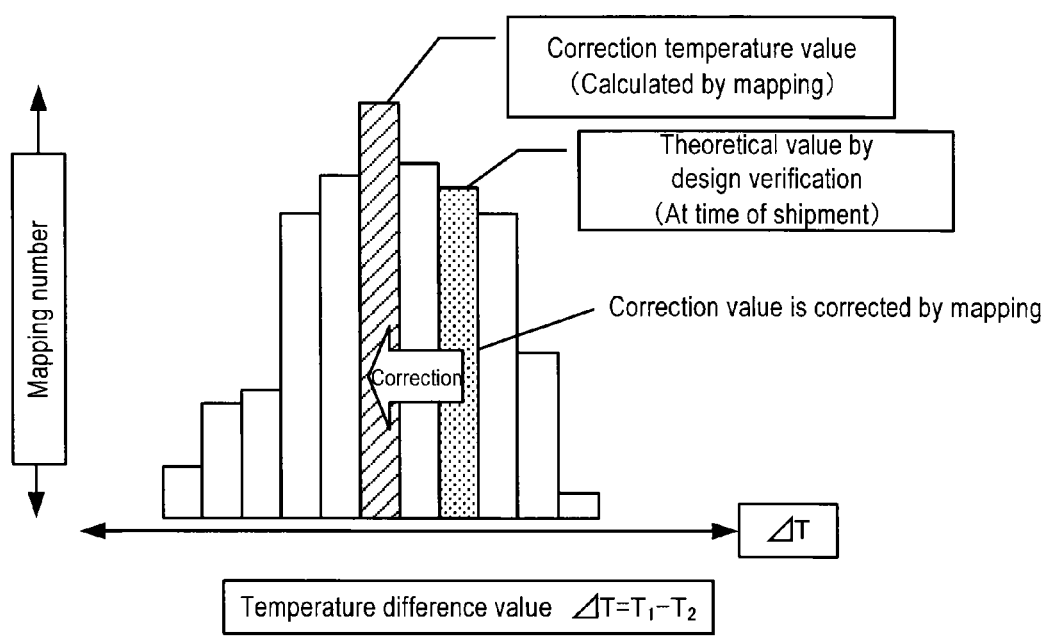
FIG. 4 is a histogram showing one example of mapping of difference value $\Delta T$.

According to the present embodiment, the difference value calculation device 12 of the control device 10 uses temperature information $T_1$, which is calculated from a detection voltage value $V_1$ that is acquired from the first temperature detection circuit 20; and temperature information $T_2$, which is calculated from a detection voltage value $V_2$ that is acquired from the second temperature detection circuit 30. As described above, to calculate the temperature information $T_1$ and the temperature information $T_2$, temperature characteristics of the thermistors are used. The temperature information $T_1$ and the temperature information $T_2$ are used to calculate: difference value $\Delta T = T_1 - T_2$. Then, the mapping device 13 carries out mapping of the difference values $\Delta T$. FIG. 4 is a histogram showing one example of the mapping of difference values $\Delta T$. In FIG. 4, the horizontal axis represents the temperature difference value $\Delta T$ in a hierarchic manner, and the vertical axis represents a mapping number (frequency). The difference value $\Delta T$ corresponding to the largest mapping number (frequency) is used as a correction value. A detailed example of how to calculate the correction value will be described later. Incidentally, the initial correction value is preferably equal to a theoretical value calculated in design verification of the temperature detection circuits.

Figure 5:
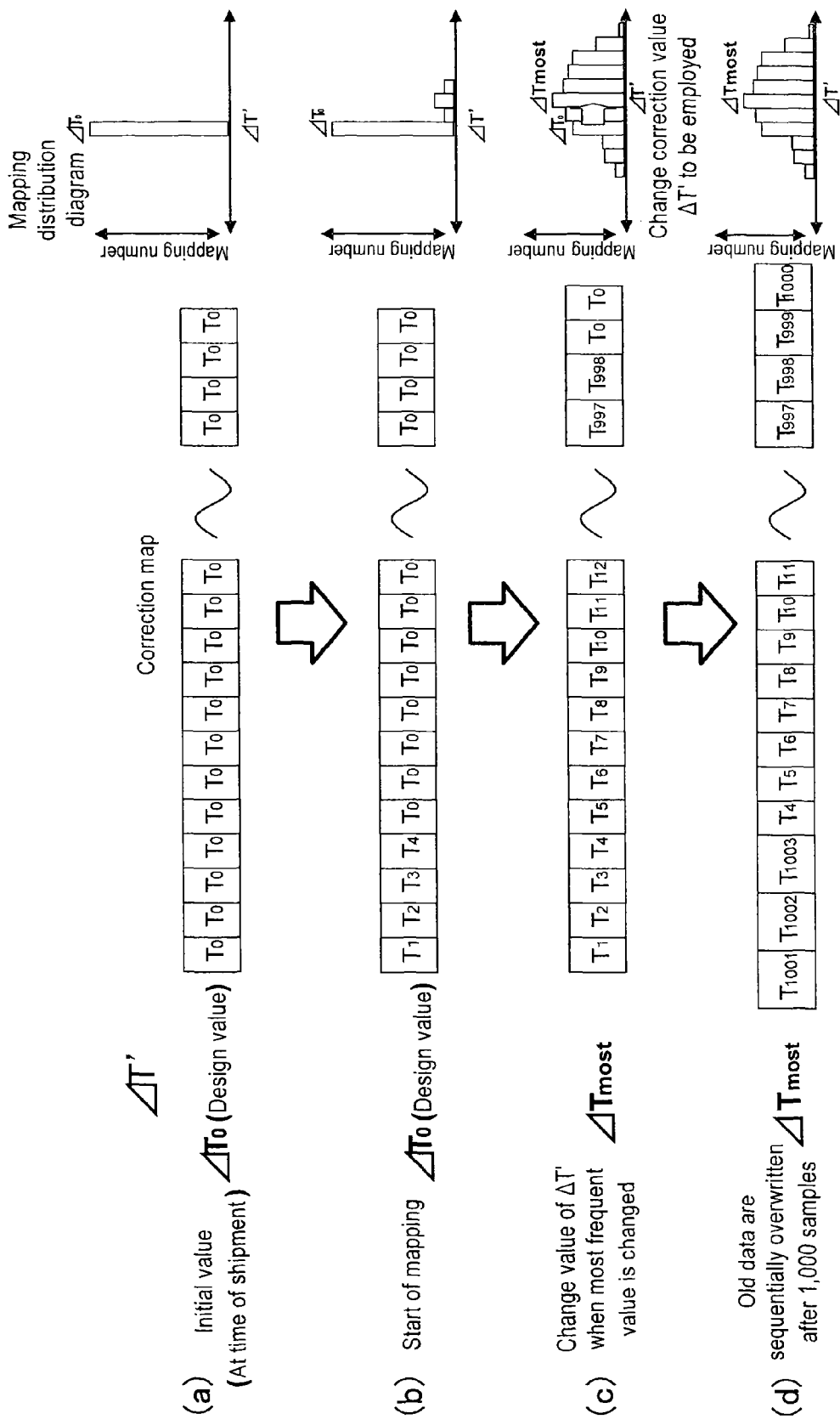
FIG. 5 is a diagram illustrating an example of details of correction-value calculation.

The following describes a detailed example of how to calculate the correction value. FIG. 5 is a diagram illustrating an example of details of correction-value calculation. For example, the difference values $\Delta T$ are calculated every 10 minutes. Given the capacity of a memory in which the values are stored, the number of samples is set to 1,000. If the initial value of $\Delta T$ (at the time of shipment) is a design value or $\Delta T_0$, and if the most frequent value of $\Delta T$ is $\Delta T'$, $\Delta T_0$ is stored in the memory. The initial mapping distribution is the one shown in FIG. 5A.

After the mapping is started, the calculated difference values are stored in the memory as $\Delta T_1, \Delta T_2, \ldots$. As a result, the mapping distribution turns out to be the one shown in FIG. 5B. In this case, $\Delta T_0 = \Delta T'$.

As the detection voltages $V_1$ and $V_2$ are further acquired, one calculated difference value after another is stored in the memory. As a result, the mapping distribution turns out to be the one shown in FIG. 5C. In this case, $\Delta T_0$ is no longer the most frequent value, and instead $\Delta T_{most}$ is the most frequent value. Therefore, as a correction value to be employed, the previous value of $\Delta T'$ shifts from $\Delta T_0$ to $\Delta T_{most}$.

As described above, given the memory capacity, data is stored until the number of samples reaches 1,000. After that, it is preferred that old data be sequentially overwritten. In this state, the mapping distribution is the one shown in FIG. 5D.

<Recovery Process>

Figure 6:
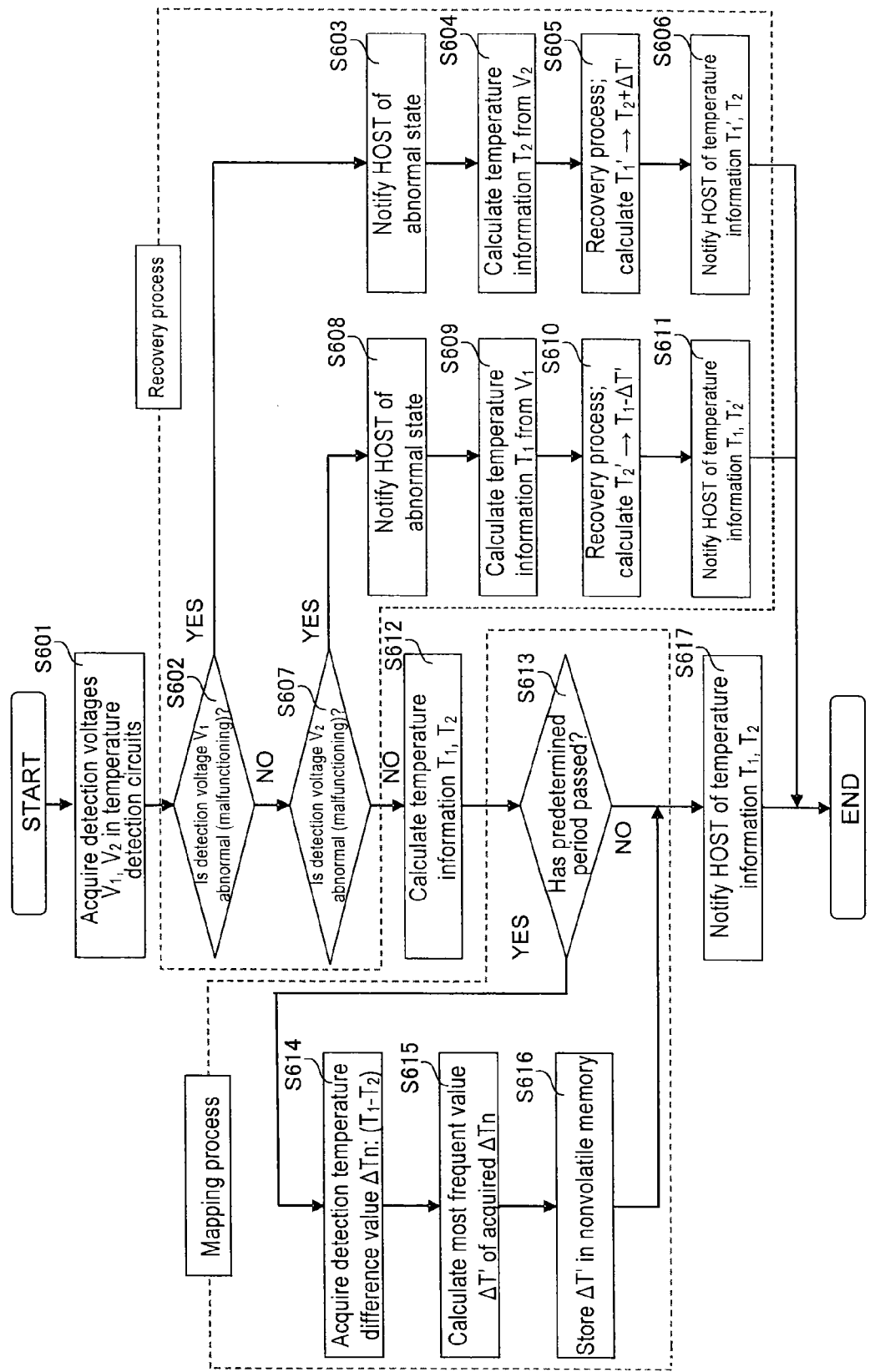
FIG. 6 is a flowchart showing the flow of a recovery process.

The flow of a recovery process by the malfunction diagnosis apparatus 100 having the above-described configuration will be described. FIG. 6 is a flowchart showing the flow of a recovery process.

First, the first temperature detection circuit 20 and the second temperature detection circuit 30 acquire the detection voltages $V_1$ and $V_2$ (step S601).

Then, a determination is made as to whether or not the detection voltage value $V_1$ of the first temperature detection circuit 20 is abnormal (malfunctioning) (step S602). As described above, malfunction diagnosis of the first temperature detection circuit 20 is dependent on whether or not the detection voltage value $V_1$ of the first temperature detection circuit 20 is a voltage within the malfunction diagnosis range A or B.

If the first temperature detection circuit 20 is diagnosed as abnormal (malfunctioning) (Yes at step S602), the host-side equipment is notified of the abnormal state (step S603).

Then, the temperature information $T_2$, which is calculated from the detect ion voltage $V_2$ is calculated (step S604).

Then, the recovery process is carried out by using the correction value $\Delta T'$, and pseudo-temperature information $T_1'$ of the temperature information $T_1$ is calculated from $T_2 + \Delta T''$ (step S605).

Then, the host-side equipment is notified of the temperature information $T_1'$ and $T_2$ (step S606), and the recovery process is ended.

If the result of step S602 is No or if the first temperature detection circuit 20 is not diagnosed as abnormal (malfunctioning), then a determination is made as to whether or not the detection voltage value $V_2$ of the second temperature detection circuit 30 is abnormal (malfunctioning) (step S607). Malfunction diagnosis of the second temperature detection circuit 30, too, is dependent on whether or not the detection voltage value $V_2$ of the second temperature detection circuit 30 is a voltage within the malfunction diagnosis range A or B.

If the second temperature detection circuit 30 is diagnosed as abnormal (malfunctioning) (Yes at step S607), the host-side equipment is notified of the abnormal state (step S608).

Then, the temperature information $T_1$, which is calculated from the detection voltage $V_1$, is calculated (step S609).

Then, the recovery process is carried out by using the correction value $\Delta T'$, and pseudo-temperature information $T_2'$ of the temperature information $T_2$ is calculated from $T_1 + \Delta T'$ (step S610).

Then, the host-side equipment is notified of the temperature information $T_2'$ and $T_1$ (step S611), and the recovery process is ended.

If the result of step S607 is No or if the second temperature detection circuit 30 is not diagnosed as abnormal (malfunctioning), then the temperature information $T_1$ and $T_2$ is calculated (step S612).

Then, a determination is made as to whether or not a predetermined period of time has passed since the power is turned ON (step S613). For example, the predetermined period is 10 minutes.

After the predetermined period has passed (Yes at step S613), temperature difference value $\Delta Tn$ is calculated from $T_1 - T_2$ (step S614).

Then, the most frequent value $\Delta T'$ of $\Delta Tn$ is calculated (step S615).

Then, the calculated $\Delta T'$ is stored in the memory as a correction value (step S616).

Then, the host-side equipment is notified of the temperature information $T_2$ and $T_1$ (step S617), and the recovery process is ended.

According to the present embodiment, even after one of the temperature detection circuits breaks down, it is possible to accurately recover and output a detection value that is originally expected to be detected. Therefore, the host-side equipment can operate normally even in the environment in which the temperature fluctuates.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A malfunction diagnosis apparatus comprising:
a first temperature detection circuit that is placed inside diagnosis-target equipment;
a second temperature detection circuit that is placed in a different location inside the diagnosis-target equipment from where the first temperature detection circuit is placed;
a difference value calculation device that calculates a difference value between a detection value from the first temperature detection circuit and a detection value from the second temperature detection circuit;
a mapping device that carries out mapping of the difference value and calculates a correction value using the frequency of the difference value;
a malfunction diagnosis device that diagnoses whether or not there is a malfunction in the first temperature detection circuit and the second temperature detection circuit; and
a recovery device that calculates, as a detection value of the first or second temperature detection circuit judged to be malfunctioning, a value by adding the correction value to a detection value from the first or second temperature detection circuit judged not to be malfunctioning, and transmits the calculated value to the diagnosis-target equipment.

2. The apparatus according to claim 1, wherein the mapping of the difference value is done on a histogram.

3. The apparatus according to claim 1, wherein the first temperature detection circuit and the second temperature detection circuit include a thermistor.

4. The apparatus according to claim 2, wherein the first temperature detection circuit and the second temperature detection circuit include a thermistor.

5. The apparatus according to claim 1, wherein:
the first temperature detection circuit is placed inside a pickup that reads information recorded on media and converts the information into electric signals;
the second temperature detection circuit is placed on a main power supply board that controls gain of a motor of the diagnosis-target equipment.

6. The apparatus according to claim 2, wherein:
the first temperature detection circuit is placed inside a pickup that reads information recorded on media and converts the information into electric signals;
the second temperature detection circuit is placed on a main power supply board that controls gain of a motor of the diagnosis-target equipment.

7. The apparatus according to claim 3, wherein:
the first temperature detection circuit is placed inside a pickup that reads information recorded on media and converts the information into electric signals;
the second temperature detection circuit is placed on a main power supply board that controls gain of a motor of the diagnosis-target equipment.

8. The apparatus according to claim 1, wherein the correction value is the most-frequent difference value.

9. The apparatus according to claim 2, wherein the correction value is the most-frequent difference value.

10. The apparatus according to claim 3, wherein the correction value is the most-frequent difference value.

11. The apparatus according to claim 4, wherein the correction value is the most-frequent difference value.

12. The apparatus according to claim 1, wherein an initial value of the correction value is a theoretical value calculated in design verification of the first temperature detection circuit and the second temperature detection circuit.

13. The apparatus according to claim 2, wherein
an initial value of the correction value is a theoretical value calculated in design verification of the first temperature detection circuit and the second temperature detection circuit.

14. The apparatus according to claim 3, wherein
an initial value of the correction value is a theoretical value calculated in design verification of the first temperature detection circuit and the second temperature detection circuit.

15. The apparatus according to claim 4, wherein
an initial value of the correction value is a theoretical value calculated in design verification of the first temperature detection circuit and the second temperature detection circuit.

16. The apparatus according to claim 5, wherein
an initial value of the correction value is a theoretical value calculated in design verification of the first temperature detection circuit and the second temperature detection circuit.

* * * * *